US010261987B1

(12) United States Patent
Liu et al.

(10) Patent No.: US 10,261,987 B1
(45) Date of Patent: Apr. 16, 2019

(54) PRE-PROCESSING E-BOOK IN SCANNED FORMAT

(71) Applicant: International Business Machines Corporation, Armonk, NY (US)

(72) Inventors: Xi Xi Liu, Shanghai (CN); Yuan Jin, Shanghai (CN); Su Liu, Austin, TX (US); Fan Xiao Xin, Shanghai (CN); Zheng Ping AC Chu, Shanghai (CN); Yu Huang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/849,286

(22) Filed: Dec. 20, 2017

(51) Int. Cl.
*G06F 17/00* (2006.01)
*G06F 17/24* (2006.01)
*G06K 9/00* (2006.01)
*G06F 17/21* (2006.01)

(52) U.S. Cl.
CPC .......... *G06F 17/241* (2013.01); *G06F 17/218* (2013.01); *G06K 9/00449* (2013.01); *G06K 9/00469* (2013.01); *G06K 9/00476* (2013.01)

(58) Field of Classification Search
CPC .................................................. G06F 17/246
See application file for complete search history.

(56) References Cited

U.S. PATENT DOCUMENTS

| | | | | |
|---|---|---|---|---|
| 5,146,552 A * | 9/1992 | Cassorla | ............... | G06F 17/241 715/200 |
| 7,260,781 B2 * | 8/2007 | DeMello | ............... | G06F 3/0481 715/711 |
| 8,539,336 B2 * | 9/2013 | Griffiths | ................ | G06F 17/241 715/200 |
| 8,838,432 B2 * | 9/2014 | Baker | ................... | G06F 17/241 704/1 |
| 9,503,337 B2 * | 11/2016 | Murray | .................. | G06Q 30/02 |
| 2003/0145282 A1 * | 7/2003 | Thomas | .................... | G06F 8/71 715/230 |
| 2003/0145310 A1 * | 7/2003 | Thames | .................... | G06F 8/71 717/123 |
| 2006/0095201 A1 * | 5/2006 | Chao | .................. | G01C 21/3679 701/426 |
| 2007/0047002 A1 * | 3/2007 | Hull | ...................... | G06F 17/211 358/3.28 |
| 2010/0278453 A1 * | 11/2010 | King | ...................... | G06Q 10/10 382/321 |
| 2011/0019915 A1 * | 1/2011 | Roman | ............ | G06F 17/30011 382/182 |

(Continued)

*Primary Examiner* — Laurie A Ries
(74) *Attorney, Agent, or Firm* — Patterson + Sheridan, LLP

(57) ABSTRACT

This disclosure provides a method and system for pre-processing an E-book, wherein the E-book comprises text pages in scanned format and annotation pages in scanned format and the annotation pages contain annotation items for explaining text elements in the text pages. The method comprises: extracting annotations from the annotation items; identifying annotated elements from the text pages, wherein an annotated element is a text element that may be determined to be associated with one of the annotations; defining positions on the text pages for the annotated elements respectively; and storing the positions and the annotations. The positions and the annotations are correlated according to their relationship with the annotated elements.

20 Claims, 6 Drawing Sheets

(56) References Cited

U.S. PATENT DOCUMENTS

| | | | |
|---|---|---|---|
| 2012/0030558 A1* | 2/2012 | Chiu | G06F 17/241 |
| | | | 715/233 |
| 2013/0185622 A1* | 7/2013 | Odean | G06F 17/30929 |
| | | | 715/230 |
| 2014/0118800 A1* | 5/2014 | Hwang | H04N 1/00331 |
| | | | 358/474 |
| 2014/0289247 A1* | 9/2014 | Okamoto | G06F 17/30867 |
| | | | 707/737 |
| 2015/0026825 A1* | 1/2015 | Dube | G06F 21/10 |
| | | | 726/28 |
| 2015/0324340 A1* | 11/2015 | Tsui | G06F 17/28 |
| | | | 715/255 |
| 2017/0147095 A1* | 5/2017 | Nicholls | G06F 3/048 |

* cited by examiner

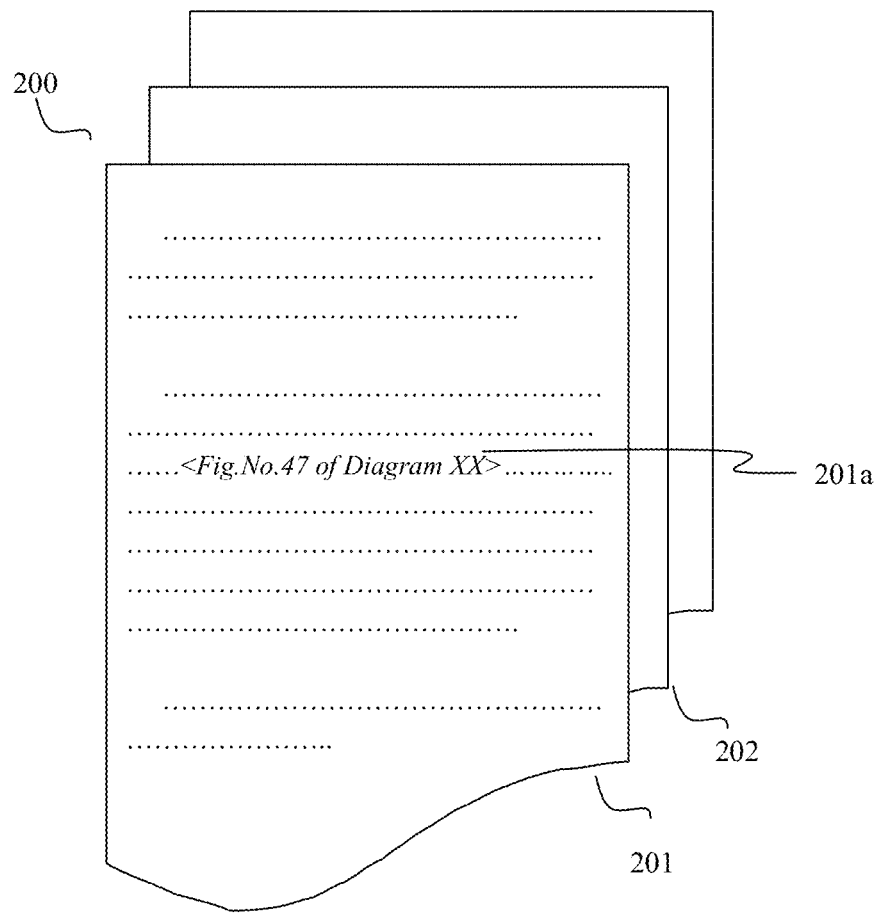
Fig.2_1
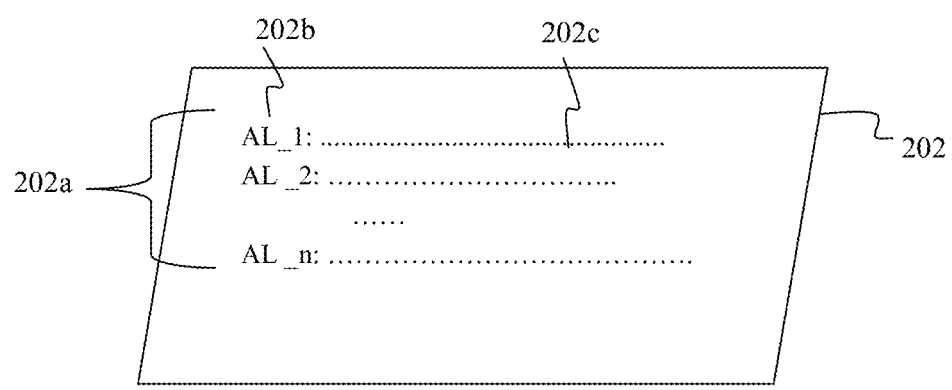
Fig.2_2

Fig 3_1

| Annotation_id | Annotation Label (Fig. No.) | Annotation (Part No.+Description) | | Metadata |
|---|---|---|---|---|
| A_1 | 1 | ... | ... | MD_1 |
| ... | ... | ... | ... | ... |
| A_47 | 47 | 66520 | Grip | MD_47 |
| ... | ... | ... | ... | ... |
| A_50 | 50 | ... | ... | MD_50 |

Fig 3_2

| Annotation_Element_Position | Annotation_id |
|---|---|
| AEP_1 | |
| ... | ... |
| 083_(x1,y1) | A_47 |
| ... | ... |
| AEP_n | |

Fig 3_3

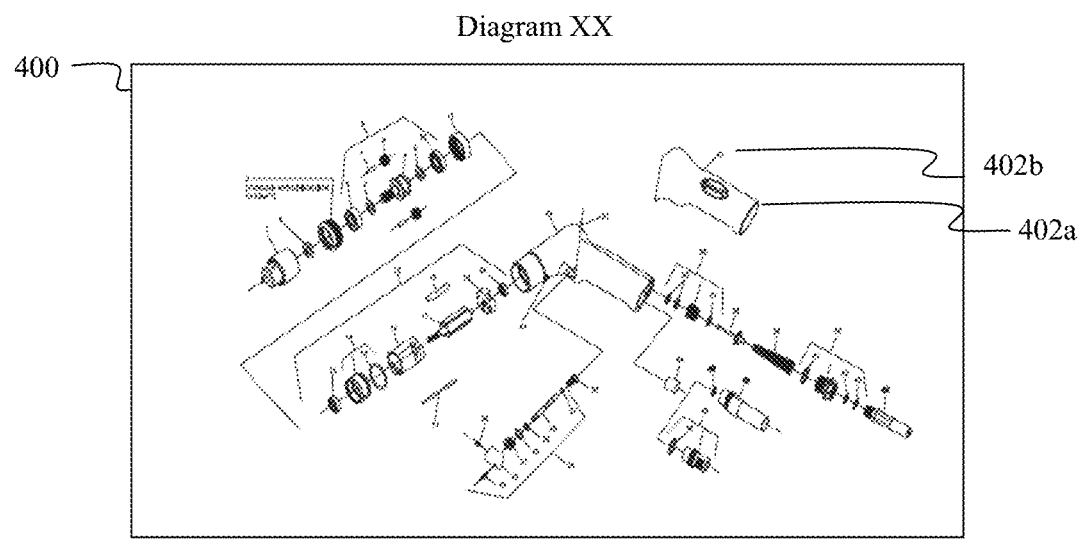
Fig. 4_1
| Diagram_Object_id | Tag_Position | Annotation_id |
|---|---|---|
| DO_1 | POT_1 | |
| ... | ... | ... |
| XX_47 | (x1,y1) | A_47 |
| ... | ... | ... |
| DO_n | POT_n | |
Fig.4_2

PRE-PROCESSING E-BOOK IN SCANNED FORMAT

BACKGROUND

The present invention relates to electronic books and, in particular, to processing of annotations and/or diagrams originally contained in scanned electronic books (E-books).

E-books are increasingly becoming popular due largely to its convenience. Electronic book resources include ancient books, classics, scientific research reports, government publications magazines, documents and so on. They are readily available in websites, smart phones as well as special-purpose E-books apparatus.

There are many types of E-books. Some E-books are scanned from paper books or documents without any change to their original layout. These kinds of E-books are referred to as scanned E-books. A scanned E-book contains scanned text pages and may additionally contain scanned annotation pages. The scanned annotation pages contain annotations associated with the text in the text pages. The annotations may also be associated with diagrams contained in the scanned annotation pages.

Scanned text pages and scanned annotation pages are substantially images. Since images are not editable by computer, it is not convenient for E-books providers to adapt text pages such that an annotation will appear in the same page as the text with which the annotation is associated. When a user is reading such a scanned E-book with an E-book reading device, he or she needs to page up and down in order to switch between text pages and annotation pages to look for annotations for the content in the text. It is especially the case when reading academic papers and professional books that usually have a number of annotations and/or complex diagrams associated with the annotations. Obviously, switching between text pages and annotation pages is not user-friendly and would spoil the reading experience.

SUMMARY OF THE INVENTION

In this disclosure, it is proposed a method, a system and a computer program product for processing E-books comprising scanned text pages and annotation pages so as to facilitate the placement of annotations in text pages for easy reference.

According to one embodiment of the present invention, there is provided a method for pre-processing an E-book. The E-book comprises text pages in scanned format and annotation pages in scanned format and the annotation pages contain annotation items for explaining text elements in the text pages. The method comprises extracting annotations from the annotation items. The method further comprises identifying annotated elements from the text pages, wherein an annotated element is a text element that may be determined to be associated with one of the annotations. The method further comprises defining positions on the text pages for the annotated elements respectively. And the method further comprises storing the positions and the annotations. The positions and the annotations are correlated according to their relationship with the annotated elements.

According to another embodiment of the present invention, there is provided a method for using an E-book on a reading device. The E-book comprises text pages in scanned format and annotation pages in scanned format and the annotation pages contain annotation items for explaining text elements in the text pages. The E-book has been pre-processed resulting in the following information stored for the E-book: positions on the text pages for annotated elements; and annotations extracted that are respectively associated with the positions. The method comprises displaying a text page of the E-book; detecting a user action at a location in the text page, wherein the location corresponds to one of the positions; and displaying an annotation that is associated with the position.

According to another embodiment of the present invention, there is provided a system. The system comprises one or more processors, a memory coupled to at least one of the one or more processors, a set of computer program instructions stored in the memory and executed by at least one of the one or more processors in order to perform actions of the method for pre-processing an E-book as described in the above.

According to another embodiment of the present invention, there is provided a system. The system comprises one or more processors, a memory coupled to at least one of the one or more processors, a set of computer program instructions stored in the memory and executed by at least one of the one or more processors in order to perform actions of the method for using an E-book as described in the above.

According to another embodiment of the present invention, there is provided a computer program product, the computer program product comprising a computer readable storage medium having program instructions embodied therewith, wherein the program instructions being executable by a device to perform a method for pre-processing an E-book. The E-book comprises text pages in scanned format and annotation pages in scanned format and the annotation pages contain annotation items for explaining text elements in the text pages. The method comprises extracting annotations from the annotation items. The method further comprises identifying annotated elements from the text pages, wherein an annotated element is a text element that may be determined to be associated with one of the annotations. The method further comprises defining positions on the text pages for the annotated elements respectively. And the method further comprises storing the positions and the annotations. The positions and the annotations are correlated according to their relationship with the annotated elements.

According to a further embodiment of the present invention, there is provided computer program product, the computer program product comprising a computer readable storage medium having program instructions embodied therewith, wherein the program instructions are executable by a device to perform the method for using an E-book as described in the above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2_1 and FIG. 2_2 illustratively depict a scanned E-book comprising text pages and annotation pages.

FIG. 3_1 illustratively depicts a sample of scanned annotation page.

FIG. 3_2 shows the information extracted from the annotation page of FIG. 3_1 according to an embodiment of the invention.

FIG. 3_3 shows the information generated for annotated elements and annotations according to an embodiment of the invention.

FIG. 4_1 shows a sample diagram associated with annotations in the annotation page of FIG. 3_1.

FIG. 4_2 shows the information generated for the diagram of FIG. 4_1 and the annotations in the annotation page of FIG. 3_1.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
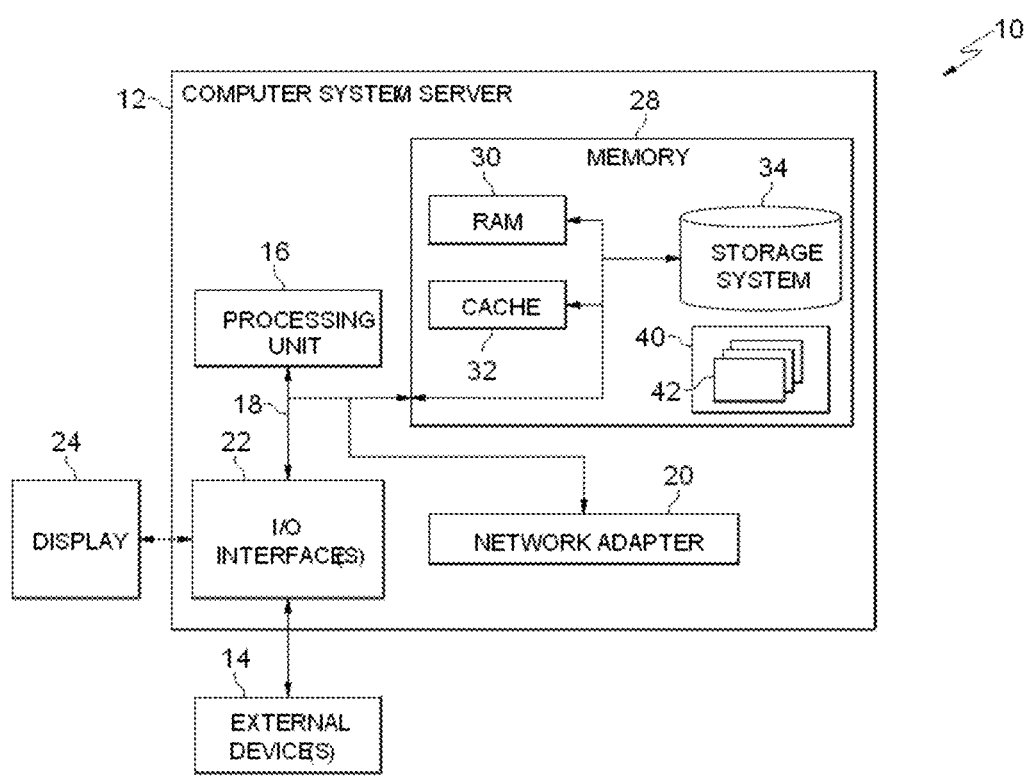
FIG. 1 shows an exemplary computer system which is applicable to implement embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The general concept of the present invention is to pre-process E-books and automatically generate annotation-related data for use while a readers is reading an E-book with a computing device as shown in FIG. 1. In the context of the present invention, E-book resources include ancient books, classics, scientific research reports, government publications magazines, documents and so on. Therefore, E-books shall be understood to also include electronic documents that may be processed, stored by computing devices and used by electronic document reading equipment, including but not limited to, E-book readers. As is commonly known, an E-book normally includes a text part and an annotation part. The annotation part contains annotations for explaining the text in the text part. An annotation may not be located in the same page as the text for which it provides explanation.

FIG. 2_1 illustratively shows a scanned E-book (hereinafter also referred to as "E-book") 200, which is the input for the processing in accordance with embodiments of the invention. As shown, E-book 200 comprises scanned text pages (hereinafter also referred to as "text pages") 201 and scanned annotation pages (hereinafter also referred to as "annotation pages") 202. The text part of E-book 200 is contained in the scanned text pages and the annotation part is contained in the scanned annotation pages. As is appreciated by those skilled in the art, the scanned text pages and the scanned annotation pages are virtually images and might be saved as separate files by a computing device like computer system/server 12 in FIG. 1.

In a text page 201, there might be one or more text elements for which annotations are provided in annotation pages 202. They are referred to as annotated elements. An annotated element might be a word, a phrase, a sentence, a symbol and so on. In FIG. 2_1, there is shown a text element <Fig.No.47 of Diagram XX> 201a in text page 201, which is an annotated element for an annotation is provided in a annotation page.

FIG. 2_2 illustratively depicts annotation page 202 of E-book 200 in more detail. As shown, annotation page 202 contains a number of annotation items 202a. Each annotation item includes at least an annotation 202c. Each annotation item may additionally include an annotation label 202b, which may serve as the link to connect annotation 202c with annotated element 201a. In FIG. 2_2, there are depicted n annotation items 202a with n annotation labels, AL_1, AL_2, . . . , and AL_n, preceding respective annotations.

According to the general concept of the present invention mentioned above, E-book 200 of FIG. 2_1 may be pre-processed so as to extract, from pages in scanned format, annotation-related information for later use in displaying annotations for text elements.

Figure 5A:
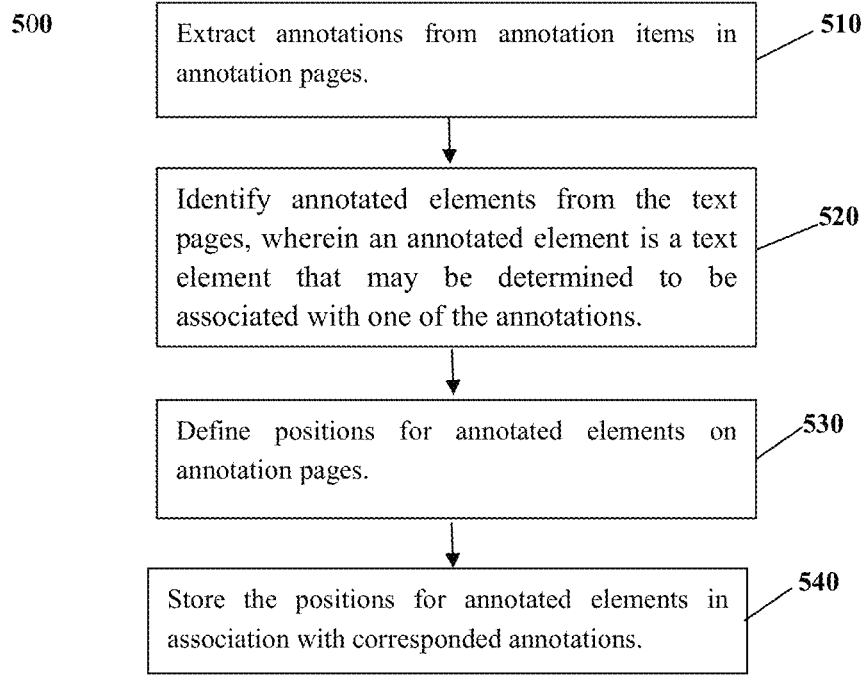
FIG. 5A is a flowchart illustrating the process of a method for pre-processing an E-book according to an embodiment of the present invention.

FIG. 5A is a flowchart of a method 500 for pre-processing E-book 200, wherein E-book 200 comprises text pages 201 in scanned format and annotation pages 202 in scanned format. The annotation pages contain annotation items 202a for explaining text elements 201a in the text pages. The method generally comprises three steps, 510, 520,530 and 540.

As a preparation step not shown in the flow chart, the content of all pages of E-book 200 may be first converted from scanned format to text format with OCR techniques, for example. Then, the converted content may be analyzed using semantic analysis techniques, for example, to identify which pages belong to the annotation pages and which pages belong to the text pages. After that, the content of the annotation pages and the text pages may be further parsed in the following steps.

In Step 510, annotations are extracted from annotation items 202a in the annotation pages 202. According an embodiment of the invention, the step may be performed for all annotation pages 202 by employing known OCR techniques and semantic analysis techniques in the following manner.

According to an embodiment of the invention, for a given annotation page 202, the content is analyzed to identify all annotation items 202a in it. Then, the annotation items are parsed to identify annotations contained in them. As shown in FIG. 2_2, an annotation item 202a may include annotation label 202b in addition to annotation 202c. In that case, annotation item 202a may be parsed to distinguish annotation 202c from annotation label 202b based on their different meanings as well as other context information. This also may be performed with semantic analysis techniques. In this way, annotation item 202a may be decomposed into annotation 202c and annotation label 202b. Then, annotation 202c may be extracted and stored.

In addition to annotation 202c, annotation label 202b may also be extracted and stored in connection with annotation 202c. For convenience of description, the annotation and the annotation label extracted in this way may be represented by a pair of <annotation label, annotation>.

To illustrate Step 510, FIG. 3_1 shows a sample of annotation page 302 in scanned format. For copyright considerations, the content of the annotation page is purposely obscured. However, it may still be discernible that the information contained in annotation page 302 is well structured, containing a number of annotation items 302a.

Assume annotation page 302 is one of the annotation pages in E-book 200 for processing by method 500. In Step 510, the content of annotation page 302 will be analyzed in the way as described in the above, resulting in extracted annotations and annotation labels as shown in FIG. 3_2.

FIG. 3_2 illustratively shows a table 320 which contains annotations and annotation labels that are extracted from sample annotation page 302 in Step 510. Table 320 has three basic columns represented by table headers "Annotation_id", "Annotation Label (Fig.No.)" and "Annotation (Part No. Description)". The cells in column "Annotation_id" contain annotation IDs that uniquely, throughout all annotation pages, identify respective annotations. The cells in column "Annotation Label (Fig.No.)" contain annotation labels, wherein "(Fig.No.)" means that, in the original annotation page, the term "Fig.No." is used to represent annotation label. The cells in column "Annotation (Part No.+Description)" contain annotations, wherein "(Part No.+Description)" means that, in the original annotation page, the term "Part No." in combination with "Description" is used to represent annotation.

There are fifty annotation items in table 320. For example, for the 47th annotation item A_47, the annotation label (Fig.No.) is "47" and the annotation (Part No.+Description) is "66520 Grip". The annotation label and the annotation may be denoted as a pair of <47, 66520 Grip>. The annotations and their associated annotation labels as shown in table 320 may be stored in database, for example. Thus, each of the annotations is retrievable for associating with an annotated element 201a, and for displaying at the same page as its associated annotated elements 201a, as will be described in following paragraphs.

According to an embodiment of the invention, metadata for annotations may also be stored, as indicated by a column represented by table header "Metadata" in table 320. The cells in this column contain predefined information for specifying the format, such as font, color, style, etc., of respective annotations to be displayed over a text page 201 in E-book 200.

After Step 510, the process proceeds to Step 520. In Step 520, annotated elements will be identified from the text pages, wherein an annotated element is a text element that may be determined to be associated with one of the annotations extracted in Step 520.

Step 520 may be performed by analyzing the content of the text pages with known semantic analysis techniques. Specifically, the content of text pages, now already converted from scanned format to text format, may be parsed page by page using semantic analysis techniques to identify all annotated elements for which associated annotations may be found.

An annotated element 201a is a text element like word, phrase, sentence or even a symbol. It is well known to readers that if a text element is associated with some annotation 202c, it is usually indicated so in some way. There are many ways to indicate so in the context of the annotated element and the indications are readily understood by the readers. As previously mentioned, annotation labels may serve as the link to connect annotations with annotated elements. Correspondingly, one typical way is to place an annotation label of annotation in between the text element or around the text element to indicate that the annotation provides explanation for the text element. By parsing the converted content of the text pages against the annotation labels extracted in Step 510, annotated elements that have associated annotations may be identified. For example, if the analysis shows that a text element relates to or refers to an expression "Fig.No. 47" in some way, the expression will be compared to the extracted annotations and/or annotation labels, such as those shown in table 320, stored in a database. If it is found that the expression "Fig.No. 47" is matching with the pair <47, 66520 Grip> in table 320, it may be determined that the text element has a corresponded annotation extracted in Step 510.

In above description, Step 510 and Step 520 are performed by employing OCR and semantic analysis. Both OCR and semantic analysis are well known techniques in the art. Because the techniques themselves are not the focus of the invention, details of their application are unnecessary and thus will be omitted here so as not to obscure the present invention. However, those skilled in the art shall appreciate how to apply the techniques in implementing embodiments of the invention. Similarly, those skilled in the art shall also appreciate that the operation of matching text elements with annotations, as mentioned above with respect to Step 520, may also performed with prior art techniques and thus description of detailed operations will also be omitted herein.

After Step 520, the process proceeds to Step 530. In Step 530, positions on the text pages for the annotated elements identified in Step 520 will be defined respectively.

According to an embodiment, a position for an annotated element in a text page is defined by the page number of the text page and an in-page position, and the in-page position may be a start point of the annotated element represented by a coordinate (x1, y1) on the text page, or an end point of the annotated element represented by a coordinate (x2, y1) on the text page. The in-page position may also be a region that covers the annotated element having x-coordinate dimensions extending from (x1, y1) to (x2, y1), or a region that covers the annotated element having x-coordinate dimensions extending from (x1, y1) to (x2, y1) and y-coordinate dimensions extending from (x1, y1) to (x1,y2).

In Step 540, the positions are stored in connection with their corresponded annotations.

Refer to FIG. 3_3, which shows a table 330 that contains positions of annotated elements and annotation identifiers for annotations corresponded to the annotated elements resulted from Step 530.

Table 330 has two columns represented by table headers "Annotation_Element_Position" and "Annotation_id". The cells in column "Annotation_Element_Position" contain position information that may uniquely identify positions of respective annotated elements 201a throughout E-book 200. Each cell may be composed of the page number of a text page 201 plus an in-page position of the annotated element within the text page. For example, Annotation_Element_Position "083_(x1, y1)" for an annotation element defines a position at coordinate (x1, y1) in page number 083.

The cells in column "Annotation_id" contain annotation identifiers that uniquely identify respective annotations throughout all annotation pages. The items in table 330 are linked with the items in table 320 via the column "Annotation_id" in the two tables. For example, in table 330, for position "083_(x1, y1)" of an annotated element, the annotation-id is "A_47". In table 320, annotation-id "A_47" corresponds to the annotation "66520 Grip". Thus, the position "083_(x1, y1)" in table 330 is associated with the annotation "66520 Grip" in table 320.

From the above description, it may be understood that the execution of process 500 may generate the following information for a given E-book: positions on the text pages for annotated elements; and annotations extracted that are respectively associated with the positions.

It is commonly known that an E-book may also include one or more diagrams in annotation pages and the diagrams are associated with some annotations. The diagrams and the associated annotations in combination serve to provide explanations for text elements in text pages.

It is mentioned in previous paragraphs that, prior to Step 510, the content of E-book 200 may be first converted to text format. Then, E-book 200 is analyzed to identify which pages belong to the annotation pages and which pages belong to the text pages. According to an embodiment of the invention, while analyzing E-book 200, diagrams in the annotation pages may also be detected. In the context of the present invention, a diagram consists of a number of diagram objects and thus may be distinguishable with known techniques. The diagram objects may be correlated with annotation items in annotation pages in various ways.

Figure 5B:
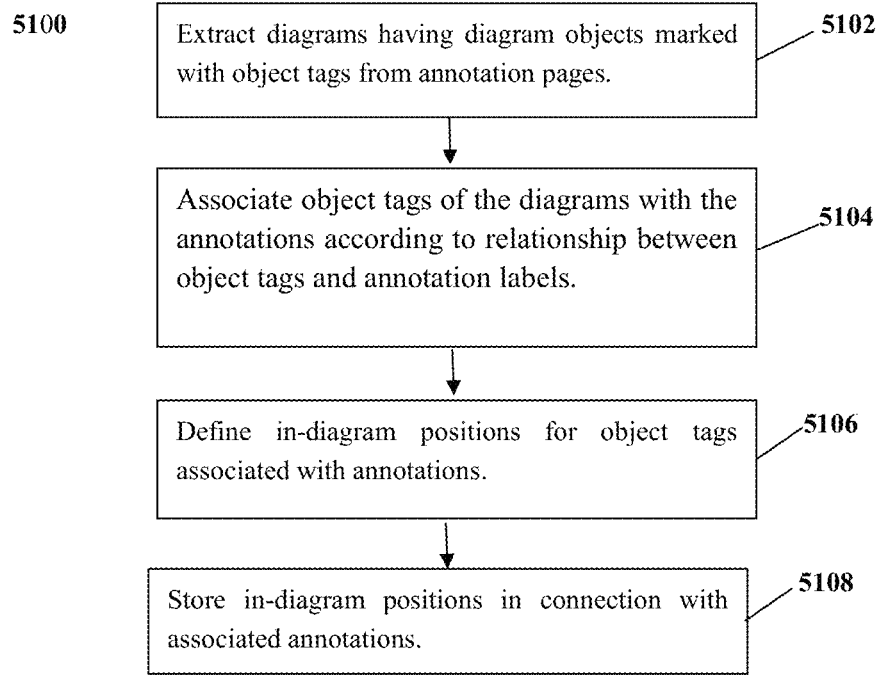
FIG. 5B is a flowchart illustrating the process of a method for pre-processing an E-book according to another embodiment of the present invention.

According to an embodiment of the invention, if the annotation pages contain one or more diagrams, method 500 will further process the diagrams. FIG. 5B is a flow chart of a process 5100 for processing E-books containing diagrams. The process comprises the Steps 5102, 5104, 5106 and 5108 performed for each individual diagrams.

In Step 5102, diagrams having diagram objects marked with object tags are extracted from the annotation pages.

FIG. 4 is a sample diagram 400 extracted from annotation pages. Diagram 400 has a unique identifier "XX" and is referred to as "Diagram XX". For purpose of illustration, here assume Diagram XX is associated with annotation items in FIG. 3_1. Again, for copyright considerations, details of Diagram XX is purposely obscured. However, it may still be discernible that it includes a number of diagram objects 402a that represent different parts of a mechanical equipment. The diagram objects are marked with object tags and the object tags correspond to annotation labels for annotation items in an annotation page. Specifically, for example, a diagram object 402a is marked with an object tag "47" 402b. The tag "47" corresponds to the annotation label ("Fig.No.") "47" for the 47$^{th}$ annotation item in annotation page 302. In this way, individual diagram objects of diagram 400 are correlated with respective annotation items 302a in annotation page 302.

In Step 5102, diagram 400 is analyzed using known image analysis techniques to identify object tags for individual diagram objects. For example, for Diagram XX 400, fifty object tags may be identified, namely "1", "2", . . . , and "50". Therefore, diagram 400 will be extracted from the annotation pages.

In this way, all such diagrams will be extracted from the annotation pages. The extracted diagrams will be stored for later use while the E-book is browsed with a reading device like E-book reader.

In Step 5104, the object tags of the diagrams will be associated with the annotations in the annotation items according to the relationship between the object tags and the annotation labels for the annotations. The step may be performed by comparing the object tags identified in Step 5102 with the annotation labels extracted from the annotation items as shown in table 320 of FIG. 3_2. If an object tag matches with an annotation label, then then the object tag will be associated with the annotation corresponded to the annotation label. For example, an object tag "47" 402b in diagram 400 matches with an annotation label "47" in table 320. Therefore, the object label "47" will be associated with annotation "66520 Grip" of which Annotation_id is "A_47" as shown in table 320.

In Step 5106, in-diagram positions for the object tags associated with the annotations will be defined. According to an embodiment, the in-diagram position of an object tag may be defined to be the end point of the object tag represented by a coordinate (x1,y1) on the diagram. It shall be understood that the in-diagram position may represent the position of the diagram object within the diagram.

In Step 5108, the in-diagram positions for the object tags will be stored in connection with their associated annotations.

Steps 5104, 5106 and 5108 may be repeatedly performed diagram by diagram, until all of the diagrams are processed.

FIG. 4_2 shows a table 420 that contains in-diagram positions of object tags and the associated annotations as a result of Step 5108.

Table 420 has three columns represented by table headers "Diagram_Object_id", "Tag_Position" and "Annotation_id". The cells in column "Diagram_Object_id" contain diagram object identifiers that uniquely identify a diagram and an object in the diagram throughout E-book 200. For example, diagram object identifier "XX_47" in table 420 is composed of a diagram identifier "XX" and an object tag "47". The diagram object identifier uniquely represents the diagram object marked with object tag "47" in Diagram XX.

The cells in column "Tag_Position" contain in-diagram positions of object tags. The cells in column "Annotation_id" contain annotation identifiers as in table 320 and table 330. Through an annotation identifier, a diagram object and its object tag are associated with an annotation. For example, the annotation-id "A_47" is for the diagram object XX_47 and in-diagram position (x1, y1) in table 420. In table 320, annotation-id "A_47" corresponds to the annotation "66520 Grip". Thus, the object tag 402b marking the diagram object XX_47 is associated with the annotation "66520 Grip" in table 320 via the annotation-id "A_47".

Therefore, from table 420 and table 320, it may be seen that the object tag) XX_47 is located at a position represented by the coordinate (x1, y1) within the diagram XX, and the object tag is associated with the annotation "66520 Grip".

From the above description, it may be understood that the execution of process 5100 will generate the following information for a given E-book: extracted diagrams extracted; and in-diagram positions of object tags for diagram objects in the diagrams.

Embodiments of method 500 for pre-processing E-book 200 have been described. In the following paragraphs, description will be provided as to how to employ the information resulted from method 500.

Figure 6:
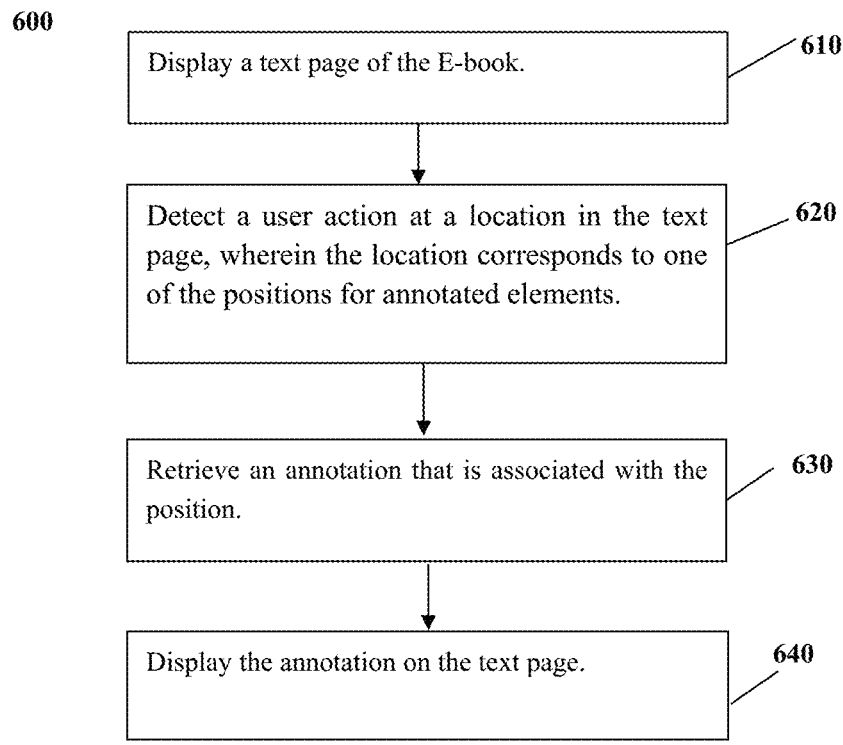
FIG. 6 is a flowchart illustrating the process of a method for using an E-book that has been processed by the method of FIG. 5A and FIG. 5B according to an embodiment of the present invention.

FIG. 6 is flow chart of a method 600 for using an E-book 200 that has been pre-processed by method 500. E-book 200 is the same as the one pre-processed by method 500. In other words, the E-book comprises text pages 201 in scanned format and annotation pages 202 in scanned format. The annotation pages contain annotation items 202a for explaining text elements 201a in the text pages. The E-book has been pre-processed by the method 500 resulting information stored for the E-book: positions on the text pages for annotated elements; and annotations that are respectively associated with the positions. The information is illustrated in table 320 of FIG. 3_2 and table 330 of FIG. 3_3.

Method 600 may be implemented on a reading device like E-book reader or other browsing tools. As shown in FIG. 6, method 600 comprises Step 610 to Step 640.

In Step 610, a text page of the E-book is displayed. The step may be triggered by a user who is browsing the E-book on a E-book reader.

In Step 620, a user action at a location in the text page is detected, wherein the location corresponds to one of the positions on the text pages for annotated elements. For example, the reader of the E-book points to text element 201a in text page 201 (FIG. 2_1). This may signify that an annotation is desired by the user who is browsing the E-book with an E-book reader. By comparing the location with the positions, it may be determined whether the location corresponds one of the positions. For example, it may be determined the location corresponds a position "083_(x1, y1)", which has been defined for annotated element A_47, as shown in table 330 of FIG. 3_3. It shall be noted that "083_(x1, y1)" in the example represents a start point of annotated element A_47. In practice, there are various ways for representing a position of an annotated element. For example, a position may be represent by an end point of an annotated element or an region that covers the annotated element.

In Step 630, an annotation that is associated with the position is retrieved. For example, the annotation "66520 Grip" associated with the position "083_(x1, y1)" may be retrieved.

In Step 640, the annotation is displayed on the text page. For example, the annotation "66520 Grip" may be displayed on page 083 of the E-book, at a distance relative to the in-page position represented by the coordinate (x1, y1) in this case. The annotation may be in various manners, of which details will be omitted here.

As mentioned previously in connection with the process 5100 in FIG. 5B, in addition to the positions and annotations, pre-processing of E-book 200 by the method 500 may also result in the following information: diagrams extracted from the annotation pages of the E-book and in-diagram positions of object tags for diagram objects in the diagrams, as shown in table 420 of FIG. 4_2.

According to an embodiment of the invention, method 600 further comprises a step 635 (not shown in FIG. 6) following Step 630.

In step 635, it is determined whether the retrieved annotation is associated with one of the in-diagram positions which corresponds to a diagram object in one of the diagrams. For example, the annotation identifier for the annotation "66520 Grip" retrieved in Step 630 is "A_47". From table 420 of FIG. 4_2, it may be determined that the annotation is associated diagram object XX_47 for which the in-diagram position of object tag is represented by a coordinate (x1, y1). Therefore, the retrieved annotation is associated with the in-diagram position corresponding to the diagram object XX_47.

In response to determining that the retrieved annotation is associated with one of the in-diagram positions which corresponds to a diagram object in one of the diagrams, then in Step 640, the annotation is displayed along with the diagram on the text page, wherein the annotation is positioned at the in-diagram position.

Figure 7:
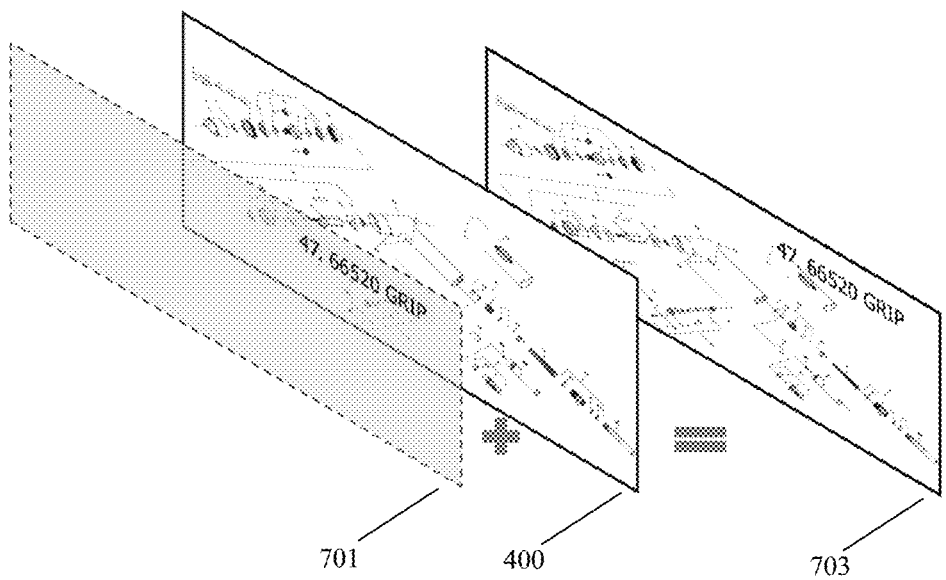
FIG. 7 illustrates an operation of a method for using an E-book according to an embodiment of the present invention.

FIG. 7 shows an example for illustrating how to display an annotation along with a diagram on a text page according to an embodiment of the invention.

In FIG. 7, it is assumed that annotation "66520 Grip" is associated with an in-diagram position represented by a coordinate (x1, y1) corresponding to diagram object XX_47 of diagram XX. To display the annotation "66520 Grip" along with diagram XX, a translucent picture 701 is generated first, with the same size as diagram 400. Picture 701 only contains the annotation "66520 Grip" arranged at the same coordinate (x1, y1) as the in-diagram position. Then, diagram 400 and picture 701 are displayed on text page 201 simultaneously, with picture 701 overlapping diagram 400. The combination of translucent picture 701 over diagram 400 will look like a single diagram 703 for annotated element 201a in text page 201.

It is to be noted that, in practice, annotations may be displayed in pre-defined format according to the metadata for individual annotations as shown in table 320. It is also to be noted that annotations may be displayed together with their corresponded annotation labels. For example, the annotation ""66520 Grip" may be displayed together with the annotation label "47", as shown in FIG. 7.

Embodiments of pre-processing and using E-books in scanned format have been described. From the description, it shall be understood that the invention may facilitate displaying of annotations and/or diagrams at text pages of E-books in scanned format on reading devices such as E-book readers or other browsing tools.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for pre-processing an E-book, the E-book comprising text pages in scanned format and annotation pages in scanned format, the annotation pages containing annotation items for explaining text elements in the text pages, the computer-implemented method comprising:
   extracting annotations from the annotation items and identifying annotated elements from the text pages, wherein an annotated element is a text element determinable as being associated with one of the annotations;
   defining positions on the text pages for the annotated elements, respectively and by operation of one or more computer processors, wherein the positions and the annotations are stored and correlated according to their relationship with the annotated elements;
   extracting annotation labels from the annotation items and storing the annotation labels in connection with corresponding ones of the annotations; and
   extracting diagrams having diagram objects marked with object tags from the annotation pages, wherein the object tags of the diagrams are associated with the annotations in the annotation items according to the relationship between the object tags and the annotation labels for the annotations.

2. The computer-implemented method of claim 1, wherein the position for each one of the annotated elements is defined by (i) the page number of a text page containing the annotated element and an (ii) in-page position selected from:
   a start point of the annotated element represented by a coordinate (x1, y1) on the text page;
   an end point of the annotated element represented by a coordinate (x2, y1) on the text page;
   a region that covers the annotated element having x-coordinate dimensions extending from (x1, y1) to (x2, y1) on the text page; and
   a region that covers the annotated element having x-coordinate dimensions extending from (x1, y1) to (x2, y1) and y-coordinate dimensions extending from (x1, y1) to (x1, y2) on the text page.

3. The computer-implemented method of claim 1, wherein the pre-processed E-book is transmitted to a reading device for output, wherein the computer-implemented method further comprises defining in-diagram positions for the object tags associated with the annotations, wherein the in-diagram positions are stored in association with the annotations.

4. The computer-implemented method of claim 3, wherein the reading device comprises an E-book reader.

5. A computer-implemented method for using an E-book, the computer-implemented method comprising:
   displaying a text page of the E-book, wherein the E-book comprises text pages in scanned format and annotation pages in scanned format, wherein the text pages include the text page, wherein the annotation pages contain annotation items for explaining text elements in the text pages, the E-book having been pre-processed to cause storing of the following information for the E-book: in-page positions on the text pages, annotations extracted and that are respectively associated with the in-page positions, diagrams extracted from the E-book, and in-diagram positions of object tags for diagram objects in the diagrams;
   detecting a user action at a location in the text page, wherein the location corresponds to one of the in-page positions; and
   upon determining, by operation of one or more computer processors, that a retrieved annotation is associated with one of the in-diagram positions that corresponds to a diagram object in one of the diagrams, displaying an annotation associated with the in-page position, wherein the annotation is displayed along with the diagram on the text page, wherein the annotation is positioned at the one of the in-diagram positions.

6. The computer-implemented method of claim 5, wherein the annotation is displayed via a reading device.

7. The computer-implemented method of claim 6, wherein the reading device comprises an E-book reader.

8. A system of pre-processing an E-book, the E-book comprising text pages in scanned format and annotation pages in scanned format, the annotation pages containing annotation items for explaining text elements in the text pages, the system comprising:
   one or more processors;
   a memory coupled to at least one of the one or more processors;
   a set of computer program instructions stored in the memory and executed by at least one of the one or more processors in order to perform actions comprising:
      extracting annotations from the annotation items and identifying annotated elements from the text pages, wherein an annotated element is a text element determinable as being associated with one of the annotations;
      defining positions on the text pages for the annotated elements, respectively and by operation of one or more computer processors, wherein the positions and the annotations are stored and correlated according to their relationship with the annotated elements;

extracting annotation labels from the annotation items and storing the annotation labels in connection with corresponding ones of the annotations; and extracting diagrams having diagram objects marked with object tags from the annotation pages, wherein the object tags of the diagrams are associated with the annotations in the annotation items according to the relationship between the object tags and the annotation labels for the annotations.

9. The system according to claim 8, wherein the position for each one of the annotated elements is defined by (i) the page number of a text page containing the annotated element and (ii) an in-page position selected from:

a start point of the annotated element represented by a coordinate (x1, y1) on the text page;

an end point of the annotated element represented by a coordinate (x2, y1) on the text page;

a region that covers the annotated element having x-coordinate dimensions extending from (x1, y1) to (x2, y1) on the text page; and a region that covers the annotated element having x-coordinate dimensions extending from (x1, y1) to (x2, y1) and y-coordinate dimensions extending from (x1, y1) to (x1, y2) on the text page.

10. The system of claim 8, wherein the pre-processed E-book is transmitted to a reading device for output, wherein the actions further comprise defining in-diagram positions for the object tags associated with the annotations, wherein the in-diagram positions are stored in association with the annotations.

11. The system of claim 10, wherein the reading device comprises an E-book reader.

12. A computer program product comprising a computer readable storage medium having program instructions embodied therewith, the program instructions executable to perform an operation for pre-processing an E-book, the E-book comprising text pages in scanned format and annotation pages in scanned format, the annotation pages containing annotation items for explaining text elements in the text pages, the operation comprising:

extracting annotations from the annotation items and identifying annotated elements from the text pages, wherein an annotated element is a text element determinable as being associated with one of the annotations;

defining positions on the text pages for the annotated elements, respectively and by operation of one or more computer processors when executing the program instructions, wherein the positions are stored and the annotations are correlated according to their relationship with the annotated elements;

extracting annotation labels from the annotation items and storing the annotation labels in connection with corresponding ones of the annotations; and extracting diagrams having diagram objects marked with object tags from the annotation pages, wherein the object tags of the diagrams are associated with the annotations in the annotation items according to the relationship between the object tags and the annotation labels for the annotations.

13. The computer program product according to claim 12, wherein the position for each one of the annotated elements is defined by (i) the page number of a text page containing the annotated element and (ii) an in-page position selected from:

a start point of the annotated element represented by a coordinate (x1, y1) on the text page;

an end point of the annotated element represented by a coordinate (x2, y1) on the text page;

a region that covers the annotated element having x-coordinate dimensions extending from (x1, y1) to (x2, y1) on the text page; and a region that covers the annotated element having x-coordinate dimensions extending from (x1, y1) to (x2, y1) and y-coordinate dimensions extending from (x1, y1) to (x1, y2) on the text page.

14. The computer program product of claim 12, wherein the pre-processed E-book is transmitted to a reading device for output, wherein the operation further comprises defining in-diagram positions for the object tags associated with the annotations, wherein the in-diagram positions are stored in association with the annotations.

15. The computer program product of claim 14, wherein the reading device comprises an E-book reader.

16. A system for using an E-book, the system comprising:
one or more processors;
a memory coupled to at least one of the one or more processors;
a set of computer program instructions stored in the memory and executed by at least one of the one or more processors in order to perform actions of:

displaying a text page of the E-book, wherein the E-book comprises text pages in scanned format and annotation pages in scanned format, wherein the text pages include the text page, wherein the annotation pages contain annotation items for explaining text elements in the text pages, the E-book having been pre-processed to cause storing of the following information for the E-book: in-page positions on the text pages, annotations extracted and that are respectively associated with the in-page positions, diagrams extracted from the E-book, and in-diagram positions of object tags for diagram objects in the diagrams;

detecting a user action at a location in the text page, wherein the location corresponds to one of the in-page positions; and upon determining that a retrieved annotation is associated with one of the in-diagram positions that corresponds to a diagram object in one of the diagrams, displaying an annotation associated with the in-page position, wherein the annotation is displayed along with the diagram on the text page, wherein the annotation is positioned at the one of the in-diagram positions.

17. The system of claim 16, wherein the system comprises a reading device, wherein the system annotation is displayed via the reading device.

18. The system of claim 17, wherein the reading device comprises an E-book reader.

19. A computer program product comprising a computer readable storage medium having program instructions embodied therewith, wherein the program instructions being executable to perform an operation for using an E-book, the operation comprising:

displaying a text page of the E-book, wherein the E-book comprises text pages in scanned format and annotation pages in scanned format, wherein the text pages include the text page, wherein the annotation pages contain annotation items for explaining text elements in the text pages, the E-book having been pre-processed to cause storing of the following information for the E-book: in-page positions on the text pages, annotations extracted and that are respectively associated with the in-page positions, diagrams extracted from the E-book, and in-diagram positions of object tags for diagram objects in the diagrams;

detecting a user action at a location in the text page, wherein the location corresponds to one of the in-page positions; and upon determining, by operation of one or more computer processors when executing the program instructions, that a retrieved annotation is associated with one of the in-diagram positions that corresponds to a diagram object in one of the diagrams, displaying an annotation associated with the in-page position, wherein the annotation is displayed along with the diagram on the text page, wherein the annotation is positioned at the one of the in-diagram positions.

20. The computer program product of claim 19, wherein the annotation is displayed via a reading device, wherein the reading device comprises an E-book reader.

* * * * *